US012686471B2

(12) United States Patent
Nootz et al.

(10) Patent No.: US 12,686,471 B2
(45) Date of Patent: Jul. 21, 2026

(54) ADJUSTABLE AQUACULTURE APPARATUS

(71) Applicant: The University of Southern Mississippi, Hattiesburg, MS (US)

(72) Inventors: Gero Nootz, Stennis Space Center, MS (US); Megan E. Gima, Ocean Springs, MS (US); Vishwamithra Reddy Sunkara, Bay St. Louis, MS (US)

(73) Assignee: The University of Southern Mississippi, Hattiesburg, MS (US)

( * ) Notice: Subject to any disclaimer, the term of this patent is extended or adjusted under 35 U.S.C. 154(b) by 0 days.

(21) Appl. No.: 17/517,444

(22) Filed: Nov. 2, 2021

(65) Prior Publication Data

US 2022/0135187 A1 May 5, 2022

Related U.S. Application Data

(60) Provisional application No. 63/108,681, filed on Nov. 2, 2020.

(51) Int. Cl.
*B63B 22/18* (2006.01)
*A01K 61/60* (2017.01)
*B63B 22/22* (2006.01)

(52) U.S. Cl.
CPC .............. *B63B 22/18* (2013.01); *A01K 61/60* (2017.01); *B63B 22/22* (2013.01); *B63B 2203/00* (2013.01); *B63B 2207/02* (2013.01)

(58) Field of Classification Search
CPC . B63B 22/00; B63B 2022/006; B63B 22/021; B63B 22/18; B63B 22/20; B63B 22/22; B63B 22/24; B63B 2207/00; B63B 2207/02; B63B 2207/04; B63B 2203/00; A01K 61/00; A01K 61/60; Y02A 40/81
USPC ...................... 441/21, 28, 29, 30, 32, 35, 54
See application file for complete search history.

(56) References Cited

U.S. PATENT DOCUMENTS

| | | | |
|---|---|---|---|
| 4,202,036 A | 5/1980 | Bowditch et al. | |
| 4,257,350 A * | 3/1981 | Streichenberger ..... | A01K 61/60 |
| | | | 119/223 |
| 4,464,851 A | 8/1984 | Collier | |
| 4,922,468 A | 5/1990 | Menezes | |
| 5,746,543 A | 5/1998 | Leonard | |
| 6,261,142 B1 | 7/2001 | Fiotakis | |
| 6,328,165 B1 * | 12/2001 | Baker ................... | A01K 79/00 |
| | | | 43/4.5 |
| 9,091,550 B1 | 7/2015 | Smith | |

(Continued)

FOREIGN PATENT DOCUMENTS

| | | |
|---|---|---|
| EP | 1872654 A1 | 1/2008 |
| EP | 3326140 A1 | 5/2018 |

(Continued)

*Primary Examiner* — Daniel V Venne
(74) *Attorney, Agent, or Firm* — Butler Snow LLP; Jon E. Holland

(57) ABSTRACT

An adjustable aquaculture assembly including a container having a plurality of open sides and defining a retention space. The open sides are configured to allow flow through the retention space. A plurality of buoyancy members are positioned on the container. Each buoyancy member may be configured to be selectively filled with and emptied of air. A pump is coupled with the plurality of buoyancy members and is configured to control airflow to and from at least one of the plurality of buoyancy members.

28 Claims, 15 Drawing Sheets

(56)                    References Cited

U.S. PATENT DOCUMENTS

| | | | |
|---|---|---|---|
| 9,166,811 B2 | 10/2015 | Lawyer et al. | |
| 9,663,203 B2 | 5/2017 | Sinclar et al. | |
| 10,099,759 B1 | 10/2018 | Mehta | |
| 10,357,023 B2 * | 7/2019 | DePaola | B63B 35/38 |
| 10,518,848 B2 | 12/2019 | Sinclair et al. | |
| 10,889,355 B2 | 1/2021 | Sinclair et al. | |
| 11,202,442 B2 * | 12/2021 | DePaola | B63B 13/00 |
| 11,516,996 B1 * | 12/2022 | DePaola | A01K 61/55 |
| 12,082,564 B2 * | 9/2024 | Sinclair | A01K 61/50 |
| 2003/0075096 A1 | 4/2003 | Leonard et al. | |
| 2007/0028849 A1 | 2/2007 | Kvietelaitis | |
| 2007/0068462 A1 | 3/2007 | de Vries et al. | |
| 2013/0259579 A1 | 10/2013 | Bonzon et al. | |
| 2015/0107688 A1 | 4/2015 | Deas et al. | |
| 2017/0259894 A1 | 9/2017 | Sinclair et al. | |
| 2018/0132320 A1 | 5/2018 | Fredricks et al. | |
| 2019/0367135 A1 | 12/2019 | Sinclair et al. | |
| 2019/0367143 A1 | 12/2019 | Sinclair et al. | |
| 2020/0029536 A1 | 1/2020 | Odlin et al. | |
| 2021/0244005 A1 | 8/2021 | Sinclair et al. | |

FOREIGN PATENT DOCUMENTS

| | | |
|---|---|---|
| WO | 2005079565 A1 | 9/2005 |
| WO | 2012015613 A1 | 2/2012 |
| WO | 2013168147 A1 | 11/2013 |
| WO | 2016134133 A1 | 8/2016 |
| WO | 2017015359 A1 | 1/2017 |
| WO | 2018073820 A1 | 4/2018 |
| WO | 2018156031 A1 | 8/2018 |
| WO | 2019151879 A1 | 8/2019 |
| WO | 2020177419 A1 | 9/2020 |

* cited by examiner

28

170

180

28

170

190

ADJUSTABLE AQUACULTURE APPARATUS

CROSS-REFERENCE TO RELATED APPLICATION

This application claims priority to U.S. Application No. 63/106,681 to Nootz et al. filed on Nov. 2, 2020, the contents of which are incorporated herein by reference.

FIELD OF THE INVENTION

This invention relates generally to an aquaculture apparatus, specifically to an aquaculture apparatus including systems to adjust the position of the apparatus to above and below the waterline.

BACKGROUND OF THE INVENTION

Aquaculture, including breeding, rearing, and harvesting of animals and plants in all types of water environments, is an increasingly important component of seafood production. However, biofouling of growing gear, such as bags and cages, and of the oyster crop by marine organisms is a common problem in mollusk farming. Currently, in order to control biofouling of shellfish (e.g., oysters) and the cages or bags the shellfish are positioned in, farmers must move aquaculture equipment between the feeding and desiccating positions to control biofouling of the cage, bags and oysters. The most common methods to desiccate off-bottom oyster aquaculture gear is to manually flip cages or to rise/lower long line systems to bring the animals out of the water to dry and reduce biofouling on animals and equipment. The flip cage method involves cages that have floats on one side. The cages are manually flipped from a position where the floats are on top and the cages are below the water line to a position where the floats are underneath and the cages are above the water line. Flipping the cages transitions the oysters between the feeding and desiccating positions, respectively. However, the traditional flip cage method requires time and man power to flip the cage, as well as specific timing requirements for in person visits, which can be affected by lack of access to the cages due to weather, availability, or other concerns.

SUMMARY OF THE INVENTION

According to one aspect of the present disclosure, an adjustable aquaculture assembly includes a container defining a retention space and configured to allow flow through the container into the retention space. A plurality of buoyancy members is coupled with the container. Each buoyancy member is configured to be selectively filled with and emptied of air. A pump is operably coupled with and configured to control airflow to and from at least one of the plurality of buoyancy members. A valve is operably coupled with at least one of the plurality of buoyancy members, and a controller is configured to actuate the pump.

According to another aspect of the present disclosure, an adjustable aquaculture assembly includes a container defining a retention space and configured to allow flow through the retention space, an upper buoyancy member positioned on a top wall of the container, a lower buoyancy member positioned on a bottom wall of the container, a first side buoyancy member positioned on a first side wall of the container, and a second side buoyancy member positioned on a second side wall of the container. The second side wall is opposite the first side wall. An air pumping system is coupled with at least one of the first and second side buoyancy members and includes a pump and a valve, wherein the air pumping system is configured to selectively control airflow to and from the at least one of the first and second side buoyancy members to selectively adjust buoyancy of the container. A controller is configured to selectively actuate at least one of the pump or the valve in response to one or more inputs.

According to another aspect of the present disclosure, an adjustable aquaculture assembly includes a container at least partially open and defining a retention space, at least one upper buoyancy member positioned on the container and configured to be selectively filled with and emptied of air, and at least one lower buoyancy member positioned on the container and configured to be selectively filled with and emptied of air. A pump is coupled with the plurality of buoyancy members, and a valve is in fluid communication with the pump. The pump and the valve are configured to selectively control airflow to and from the lower buoyancy member.

These and other aspects, objects, and features of the present disclosure will be understood and appreciated by those skilled in the art upon studying the following specification, claims, and appended drawings.

BRIEF DESCRIPTION OF THE DRAWINGS

The drawings shown below and in the attached documents are intended to illustrate further the invention and its advantages. The drawings, which are incorporated in and form a portion of the specification, illustrate certain preferred embodiments of the invention and, together with the entire specification, are meant to explain preferred embodiments of the present invention to those skilled in the art. Relevant figures in this Application are shown or described, as follows.

DETAILED DESCRIPTION OF THE INVENTION

Figure 1:
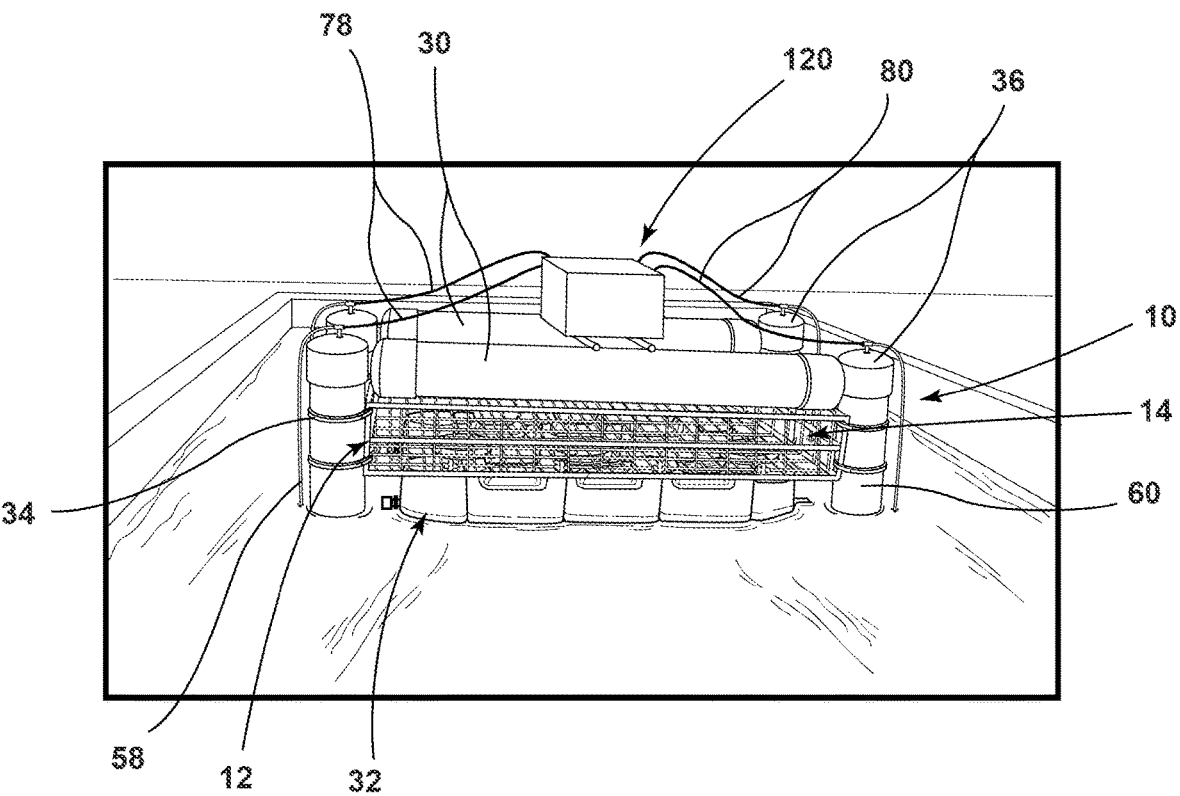
FIG. 1 is a side perspective view of an aquaculture assembly including a container supported by a plurality of buoyancy members positioned within a test pool, accordingly to various examples.

The present illustrated embodiments reside primarily in combinations of method steps and apparatus components related to an adjustable aquaculture assembly and the methods and systems for adjusting said aquaculture assembly. The aquaculture assembly may include methods and systems for controlling automation of the transition between feeding and desiccation position of the oyster cages, scheduling transitioning between positions of the assembly, coupling the assembly with a device or other remote control feature, and/or other positioning features that promote a more economically effective way of controlling biofouling of off-bottom aquaculture equipment (e.g., farmed shellfish such as oysters). Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-16, reference numeral 10 generally refers to an adjustable aquaculture assembly including a container 12 having a plurality of side walls 16 and defining a retention space 14. One or more of the side walls 16 may be at least partially open. The side walls 16 are configured to allow flow of water through the retention space 14. A plurality of buoyancy members 18 are positioned on the container 12. Each buoyancy member of the plurality of buoyancy members 18 may define a chamber 20 configured to be selectively filled with and/or emptied of air or water. A pump 22 may be coupled with the plurality of buoyancy members 18 and configured to control airflow to and from at least one of the plurality of buoyancy members 18. A valve 24 may be in fluid communication with at least one of the plurality of buoyancy members 18. A controller 26 is configured to actuate the pump 22 and/or valve 24. In various examples, the controller 26 may be configured to communicate wirelessly with an electronic device 28.

Referring now to FIG. 1, the aquaculture assembly 10 is illustrated partially submerged in water. As previously introduced, the aquaculture assembly 10 includes the container 12 having a plurality of side walls 16. The container 12 defines a retention space 14. The retention space 14 may be configured to receive an aquaculture crop, such as shellfish. In various examples, the container 12 may be a rigid cage, as illustrated. In other examples, the container 12 may be a non-rigid cage (e.g., formed of a net or other material). It will be understood that the container 12 may be any container formed of any material conducive to allowing water to flow through the container 12 and into the retention space 14. It will further be understood that the container 12 may be any size or shape configured to house an aquaculture crop without departing from the scope of the present disclosure.

Figure 2:
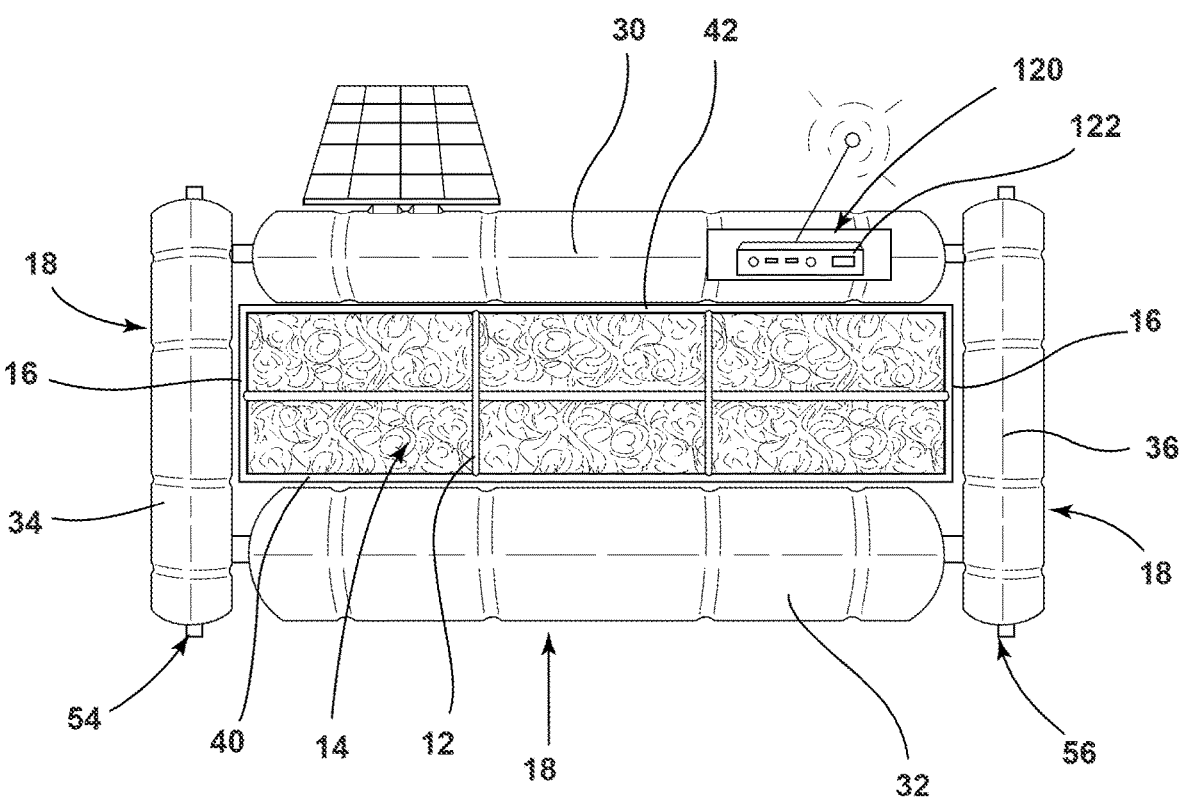
FIG. 2 is a side elevation view of an aquaculture assembly including a container supported by a plurality of buoyancy members.
Figure 3:
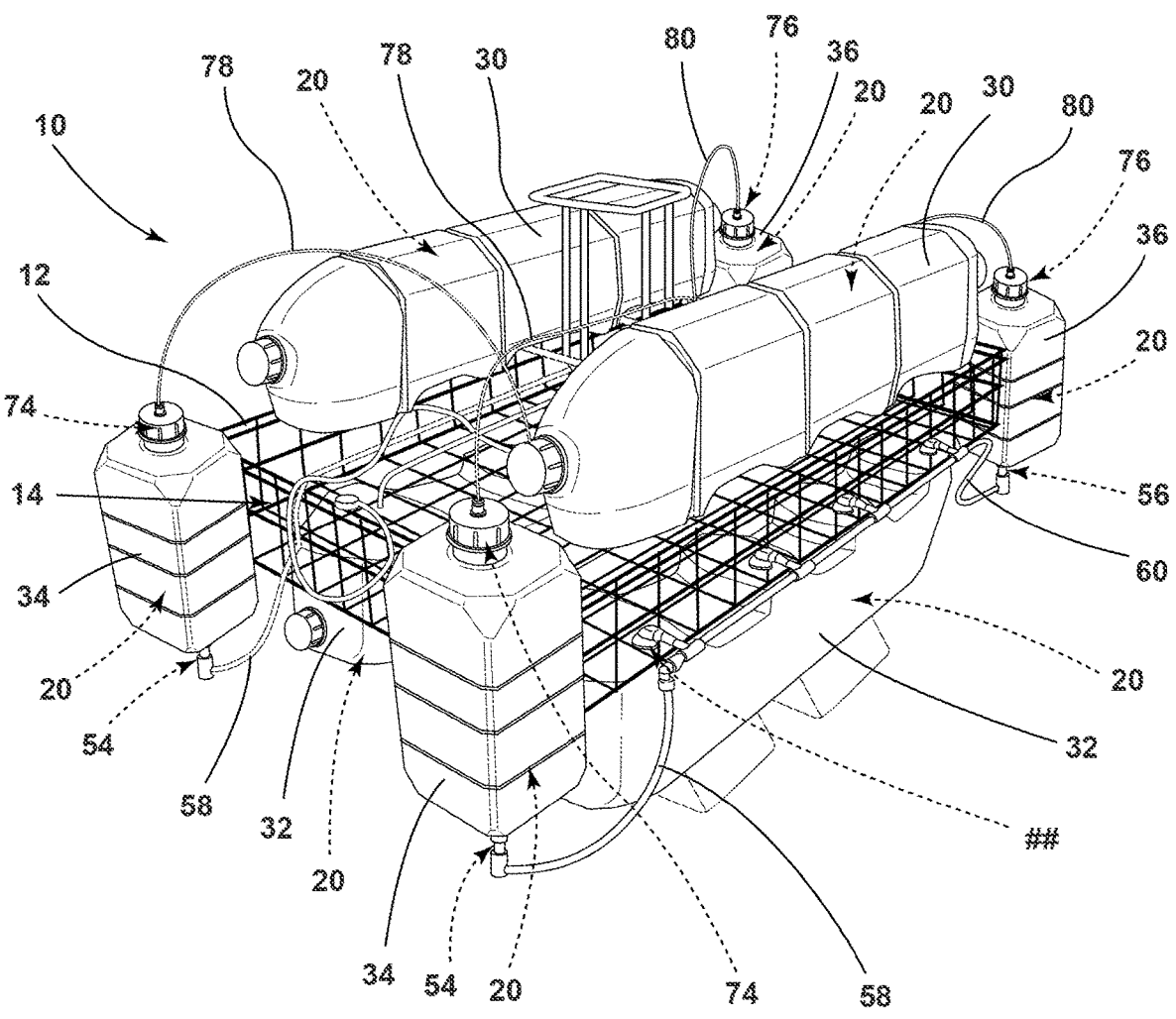
FIG. 3 is a side perspective view of an aquaculture assembly including a container supported by a plurality of buoyancy members.

Referring now to FIGS. 1-3, the aquaculture assembly 10 includes a plurality of buoyancy members 18. The plurality of buoyancy members 18 may include an upper buoyancy member 30, a lower buoyancy member 32, a first side buoyancy member 34, and a second side buoyancy member 36. It is also understood that each group of buoyancy members can be joint to for a single buoyancy member for example the lower buoyancy member and two side buoyancy members could be joint to form a single buoyancy member. Each of the buoyancy members 30, 32, 34, 36 may be hollow and configured to be selectively filled with air and/or water, as discussed in more detail elsewhere herein. It is contemplated that various combinations of buoyancy members 30, 32, 34, 36 may be used, including having multiple of any of the buoyancy members 30, 32, 34, 36 without departing from the scope of the present disclosure.

As shown in FIG. 1-3, the container 12 may be supported by two or more buoyancy members 30, 32, 34, 36 (e.g., an upper buoyancy member 30 and a lower buoyancy member 32, two lower buoyancy members 32, or two upper buoyancy members 30). The lower buoyancy member 32 may be positioned on a bottom wall 40 of the container 12. The upper buoyancy member 30 may be positioned on a top wall 42 of the container 12. The first and second side buoyancy members 34, 36 may be positioned on opposing side walls 16 of the container 12. It will be understood that the dimensions of the buoyancy members 30, 32, 34, 36 are variable and may be adjusted to accommodate various containers 12 and other considerations without departing from the scope of the present disclosure. For example, each of the buoyancy members 30, 32, 34, 36 may be the same size and shape or may have varying sizes and/or shapes.

Each of the buoyancy members 30, 32, 34, 36 may be coupled directly to the container 12. For example, the buoyancy members 30, 32, 34, 36 may be coupled with the container 12 using a bracket or other fastener. As shown in FIG. 3, each of the buoyancy members 30, 32, 34, 36 may be a pair of buoyancy members. In other examples, each of the buoyancy members 30, 32, 34, 36 may be a set (more than 3) of buoyancy members. In still other examples, each of the buoyancy members 30, 32, 34, 36 may be a single buoyancy member.

Figure 4A:
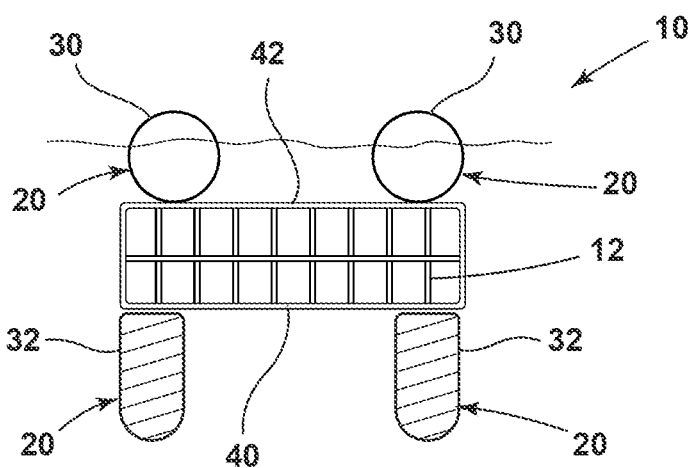
FIG. 4A is a schematic diagram of a first exemplary configuration of buoyancy members of an aquaculture assembly.
Figure 4B:
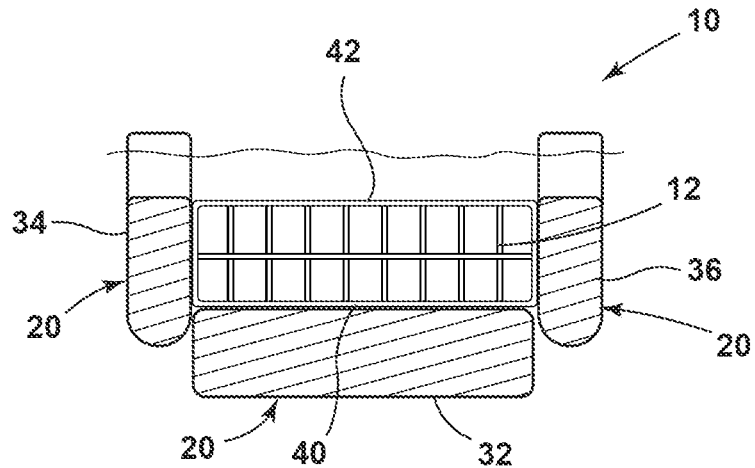
FIG. 4B is a schematic diagram of a second exemplary configuration of buoyancy members of an aquaculture assembly.
Figure 4C:
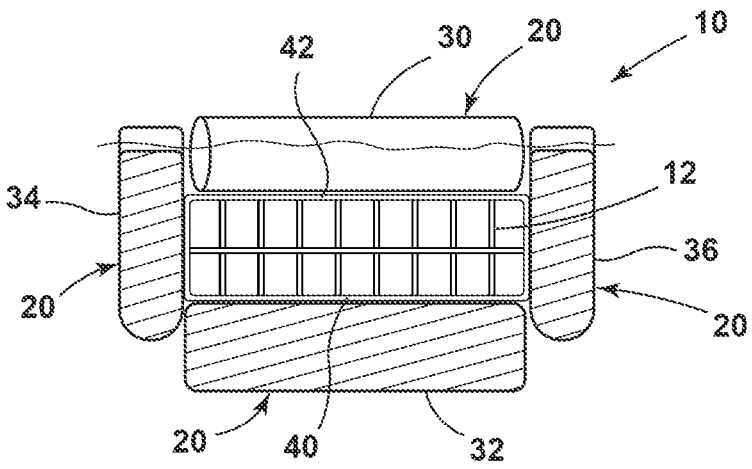
FIG. 4C is a schematic diagram of a third exemplary configuration of buoyancy members of an aquaculture assembly.

In FIG. 4A-4C, exemplary arrangements of buoyancy members 30, 32, 34, 36 are illustrated in elevation views. While only one of each type of buoyancy members 30, 32, 34, 36 is visible in the illustrations, it will be understood that the buoyancy members 30, 32, 34, 36 may be duplicated, as discussed above, without departing from the scope of the present disclosure.

Referring now to FIG. 4A, a first exemplary arrangement of the aquaculture assembly 10 is shown including a container 12, a pair of upper buoyancy members 30 and a pair of lower buoyancy members 32. The lower buoyancy members 32 are at least partially filled with water, and the upper buoyancy members 30 are filled with air. This allows the aquaculture assembly 10 to maintain a floating position (i.e., a position in which at least a portion of the aquaculture assembly 10 is at or above the surface of the body of water and the container 12 is below the surface of the body of water).

In FIG. 4B, a second exemplary arrangement of the aquaculture assembly 10 is shown including a container 12, a lower buoyancy member 32, a first side buoyancy member 34, and a second side buoyancy member 36. The respective chamber 20 of each of the first and second side buoyancy members 34, 36 is at least partially filled with water. The air contained within the respective chambers 20 of each of the first and second side buoyancy members 34, 36 is configured to maintain the aquaculture assembly 10 at the floating position.

In FIG. 4C, a third exemplary arrangement of the aquaculture assembly 10 is shown including a container 12, a lower buoyancy member 32, an upper buoyancy member 30, and first and second side buoyancy members 34, 36. The upper buoyancy member 30 is filled with air. Each of the first and second side buoyancy members 34, 36 are at least partially filled with water. The air within the first and second side buoyancy members 34, 36 and the air-filled upper buoyancy member 30 is configured to maintain the aquaculture assembly 10 at the floating position.

In various examples, the first and second side buoyancy members 34, 36 may be configured to stabilize the container 12, particularly when the aquaculture assembly 10 is moved from the floating position to a raised position (i.e., a position in which the aquaculture assembly 10 is at or above the surface of the body of water and the container 12 is above the surface of the body of water). This stability may reduce tilt of the aquaculture assembly 10 and may increase efficiency in desiccation and nutrient uptake of the aquaculture crop within the retention space 14.

When the aquaculture assembly 10 experiences any tilting force, the first and second side buoyancy members 34, 36 are configured to displace additional water when the container

12 is tilting to one side, shifting the center of buoyancy in the direction of the tilt and resulting in a righting movement (i.e., a torque that acts against the tilt of the container 12).

Figure 5A:
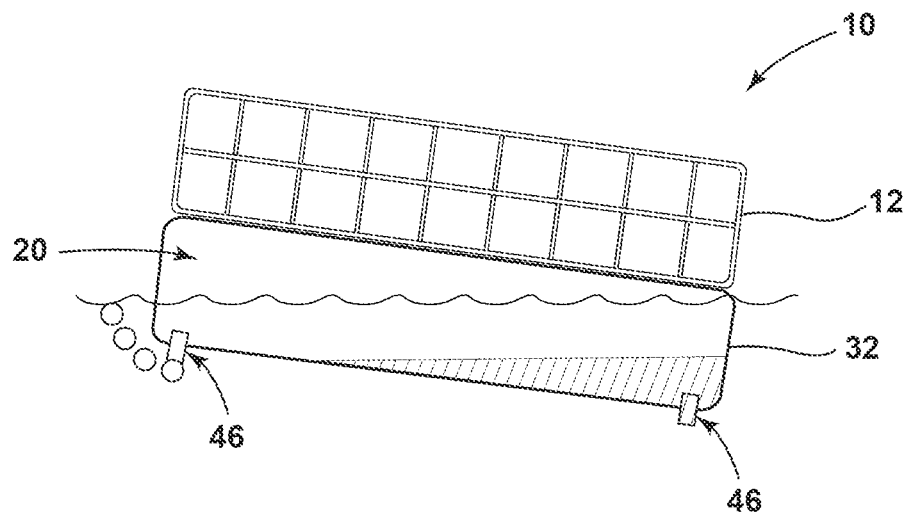
FIG. 5A is a schematic diagram of a container with a lower buoyancy member partially filled with air and partially filled with water, the lower buoyancy member having vents to allow flow of air and water.
Figure 5B:
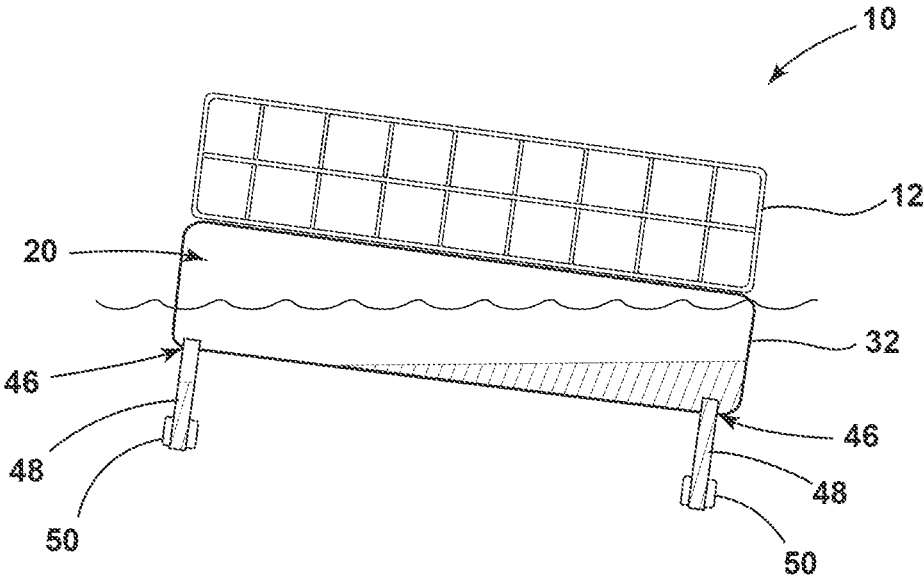
FIG. 5B is a schematic diagram of the container and lower buoyancy member of FIG. 5A including vent tubes coupled with the vents.

Referring now to FIG. 5A, the lower buoyancy member 32 may define one or more vents 46. The vents 46 are configured to allow water to enter and/or escape from the chamber 20 of the lower buoyancy member 32. As shown in FIG. 5B, each of the vents 46 may be coupled with a respective vent tube 48. The vent tube 48 may be weighted to prevent air from escaping from the chamber 20 of the lower buoyancy member 32 before the lower buoyancy member 32 is emptied during vertical rotation. It is contemplated that the size of the vent tubes 48 may be varied and/or adjusted to suit the size of the container 12 and aquaculture assembly 10. In various examples, each of the vent tubes 48 may include a weight 50 to ensure the tube 48 is pointing straight down and allows full release of air from the lower buoyancy member 32.

Referring again to FIG. 3, each of the first and second side buoyancy members 34, 36 may define one or more vents 54, 56, respectively. The vents 54, 56 are configured to allow water and/or air to enter and/or escape from the respective chambers 20 of the side buoyancy members 34, 36. In various examples, each of the vents 54, 56 may be coupled with a respective vent tube 58, 60.

Referring now to FIGS. 6A-8, the aquaculture assembly 10 may include an air pumping system 64 including one or more pumps and/or one or more valves. In various examples, the air pumping system 64 may include a compressor and/or a pressure system. The air pumping system 64 is configured to direct air into and out of the chambers 20 of the buoyancy members 30, 32, 34, 36, as discussed in more detail below. Filling the chambers 20 of the buoyancy members 30, 32, 34, 36 with air raises the container 12 out of the water into the raised position. Removing the air from any one of the buoyancy members 30, 32, 34, 36 allows water to fill the respective chamber 20 such that the container 12 is allowed to sink to a predetermined level (e.g., the floating position). Each of the examples of the air pumping system 64 illustrated herein includes one or more pumps 22 for controlling air flow to and from the aquaculture assembly 10 and/or one or more valves 24 for selectively directing the airflow into and out of the buoyancy members 30, 32, 34, 36. Accordingly, consistent reference numerals are used for the same or similar elements. It will be understood that these examples are exemplary only and may be used with any combination of buoyancy members 30, 32, 34, 36. It will also be understood that each of the buoyancy members 30, 32, 34, 36 may be filled using a single individual pump 22 or as a unit using a main pump 22 or a plurality of pumps 22 without departing from the scope of the present disclosure.

Figure 6A:
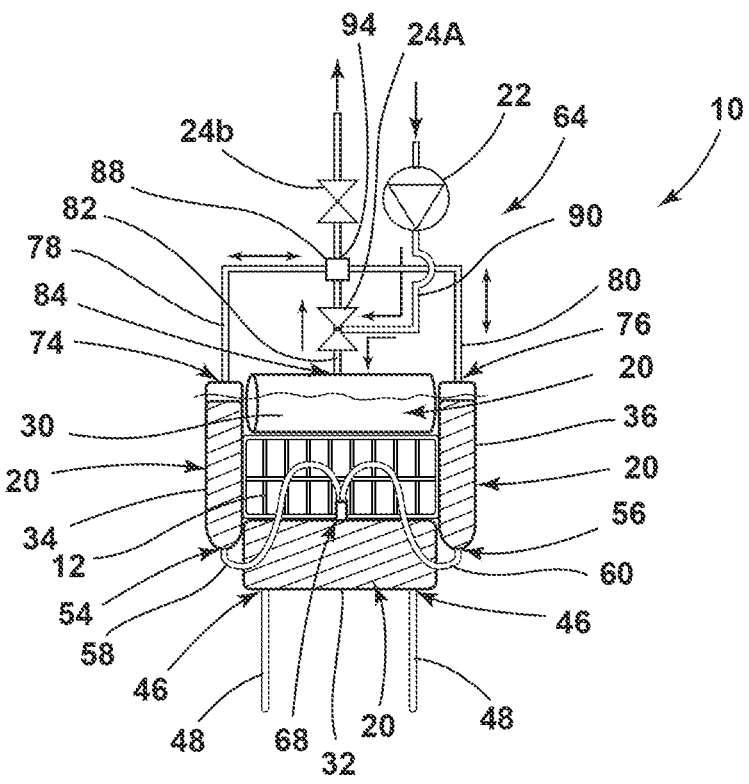
FIG. 6A is a schematic diagram of an aquaculture assembly having a first exemplary air pumping system.

As shown in FIG. 6A, the vent tube 58 of the first side buoyancy member 34 may be in fluid communication with the vent 54 of the first side buoyancy member 34 and may extend from the vent 54 to a connection port 68 defined by the lower buoyancy member 32. The vent tube 60 of the second side buoyancy member 36 may be in fluid communication with the vent 54 of the first side buoyancy member 34 and may extend from the vent 56 to the same connection port 68 defined by the lower buoyancy member 32. Alternatively, each of the tubes 58, 60 may be in fluid communication with a plurality of other tubes and fittings to couple with the connection port 68. The connection port 68 may be one of a plurality of connection ports 68. Where the connection port 68 is one of a plurality of connection ports 68, the vent tubes 58, 60 may be coupled with separate connection ports 68. Each of the vent tubes 58, 60 is in fluid communication with the chamber 20 of the respective side buoyancy member 34, 36 and with the chamber 20 of the lower buoyancy member 32 such that fluid (air or water) can flow between the chambers 20 of the first and second side buoyancy members 34, 36 and the lower buoyancy member 32.

Each of the first and second side buoyancy members 34, 36 may include one or more respective connection ports 74, 76. The first connection port 74 of the first side buoyancy member 34 may be coupled with a first air tube 78, and the second connection port 76 of the second side buoyancy member 36 may be coupled with a second air tube 80. Each of the first and second air tubes 78, 80 may be operably coupled with and in fluid communication with a first central air tube 82. In various examples, the first and second air tubes 78, 80 may be coupled with the first central air tube 82 by a fitting 94 or other coupling member configured to maintain communication between the first and second air tubes 78, 80 and the first central air tube 82. The first central air tube 82 may be operably coupled with a connection port 84 defined by the upper buoyancy member 30. This allows the upper buoyancy member 30 to be used to store compressed air for transfer into one or both of the first and second side buoyancy members 34, 36 and, subsequently, into the lower buoyancy member 32.

A first valve 24A may be coupled with the first central air tube 82 proximate the connection port 84 of the upper buoyancy member 30. In other words, the first valve 24A may be positioned between the upper buoyancy member 30 and the first and second air tubes 78, 80 with the first central air tube 82. In various examples, the first valve 24A may be a solenoid valve. However, it will be understood that other valve types may be used without departing from the scope of the present disclosure. The first valve 24A may include a first valve port coupled with the first central air tube 82 and a second port coupled with a second central air tube 88. In various examples, the third port of the first valve 24A may be coupled with a fill tube 90. The fill tube 90 may extend between a pump 22 and the first valve 24A and may be configured to receive air from the pump. The first valve 24A is configured to allow air flow from the pump 22 to enter through the third port and flow through one or both of the first and second ports. This allows the pump 22 pump air directly into and/or out of the upper buoyancy member 30 and/or the first and second side buoyancy members 34, 36. Alternatively, the pump 22 may be turned off after filling the upper buoyancy member 30 with air. In this alternative example, the first valve 24A may be used to control the flow of compressed air into the buoyance float while pump 24 is inactive.

The first valve 24A is further configured to allow air to flow from the upper buoyancy member 30 into the second port and out the first port to transfer air from the upper buoyancy member 30 to the first and second side buoyancy members 34, 36. When the first and second buoyancy members 34, 36 are filled with air, the water is pushed through the vent tubes 58, 60 into the lower buoyancy member 32. Excess water is displaced through the vent tubes 48 of the lower buoyancy member 32. As air is supplied to the first and second side buoyancy members 34, 36, the additional air flows through the vent tubes 58, 60 and into the lower buoyancy member 32, allowing the lower buoyancy member 32 to be at least partially filled with air. Blowing out the water of the lower buoyancy member 32 by pumping air into the first and second side buoyancy members 34, 36 lifts the aquaculture assembly 10 into the raised position to allow the mollusks in the container 12 to desiccate (also called holding the assembly 10 in the "desiccation position"). Pumping air out of the first and second side buoyancy members 34, 36 allows water to flood at least the lower buoyancy member 32, and, in some cases if enough air is removed, first and second side buoyancy members 34, 36. This allows the aquaculture assembly 10 to return to the floating position to allow the mollusks to feed (also called holding the assembly 10 in the "feeding position").

A second valve 24B may be coupled with and in fluid communication with the second central air tube 88. In various examples, the second valve 24B may be a solenoid valve. However, it will be understood that other valve types may be used without departing from the scope of the present disclosure. The second valve 24B may be configured to selectively allow air to flow out of second central air tube 88 and, subsequently, the upper buoyancy member 30 and the first and second side buoyancy members 34, 36. For example, when the second valve 24B is open, the air may exit the aquaculture assembly 10, and, when the second valve 24B is closed, the air remains in one or both of the first and second side buoyancy members 34, 36, the lower buoyancy member 32, and/or the upper buoyancy member 30. It is contemplated that, where the pump 22 is removably coupled with the first valve 24A or absent from the air pumping system 64, the second valve 24B may be removed in some examples.

Figure 6B:
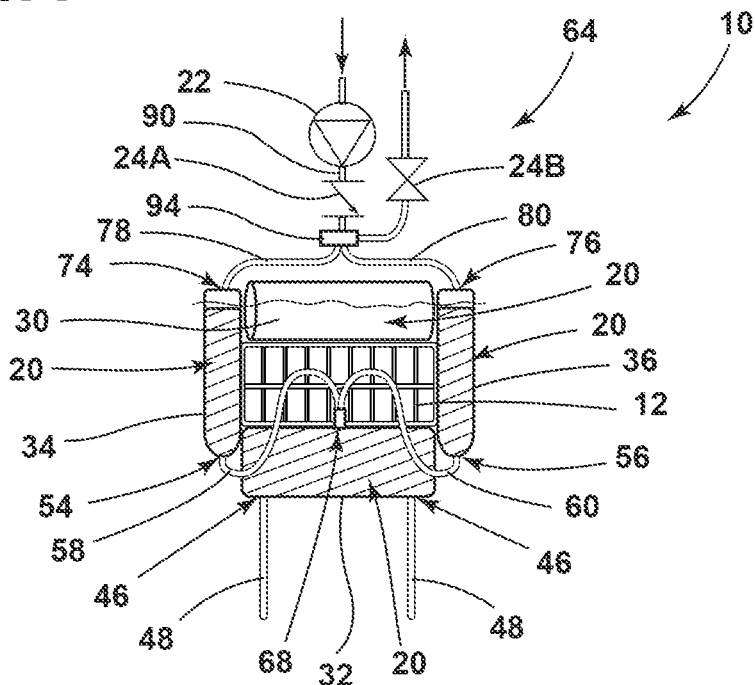
FIG. 6B is a schematic diagram of an aquaculture assembly having a second exemplary air pumping system.

Alternatively, as shown in FIG. 6B, the pump 22 may be configured to provide air directly to the first and second side buoyancy members 34, 36. The pump 22 may be operably coupled with the first valve 24A to allow the pump 22 to directly supply air to the first and second side buoyancy members 34, 36 through the first and second air tubes 78, 80. In this configuration, the first valve 24A may be a check valve. However, it will be understood that other valve types may be used without departing from the scope of the present disclosure. The second valve 24B may be coupled with and in fluid communication with the first and second air tubes 78, 80 (e.g., using a fitting 94 or another air tube) and may be configured to selectively allow air to flow out of the first and second air tubes 78, 80. In various examples, the second valve 24B may be a solenoid valve. However, it will be understood that other valve types may be used without departing from the scope of the present disclosure.

Figure 7A:
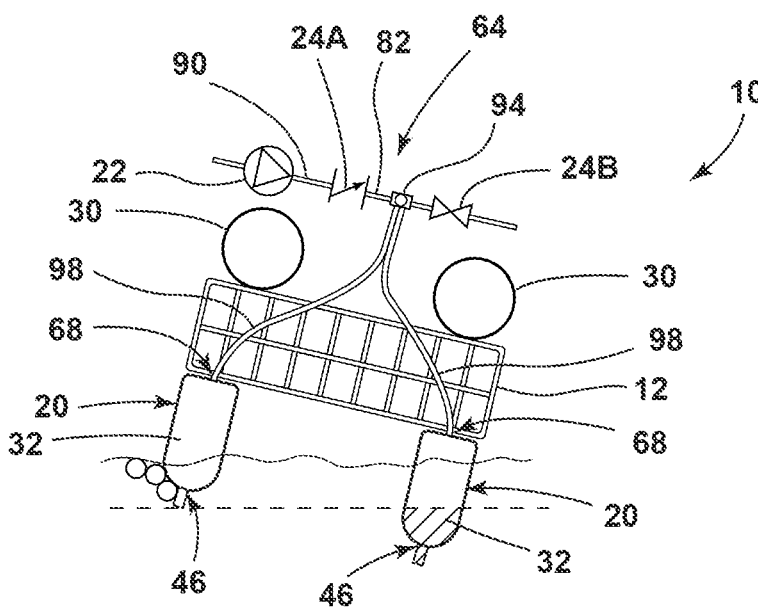
FIG. 7A is a schematic diagram of an aquaculture assembly having an exemplary air pumping system and lower buoyancy members defining vents.
Figure 7B:
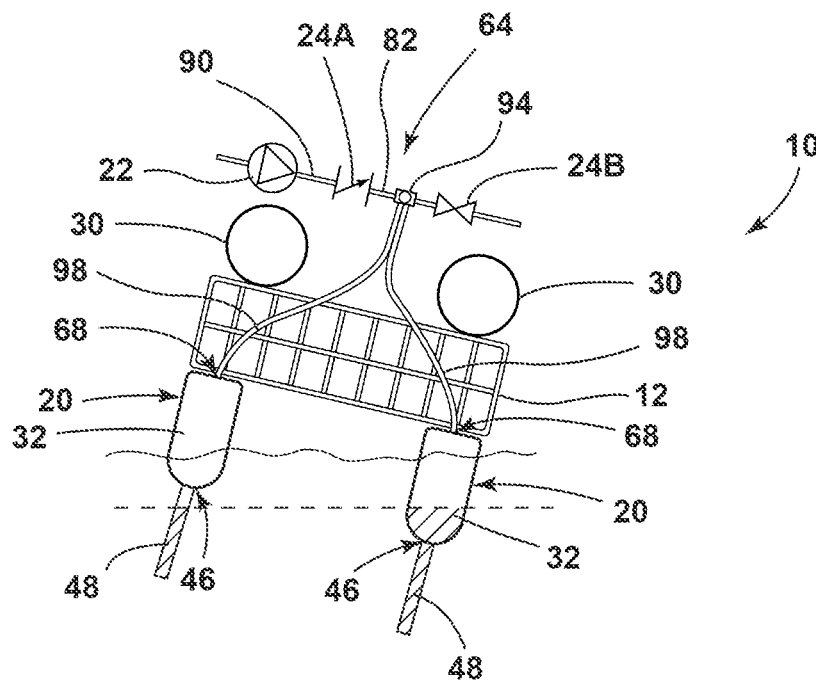
FIG. 7B is a schematic diagram of the aquaculture assembly of FIG. 7A with vent tubes coupled with the vents of the lower buoyancy members.

Referring now to FIGS. 7A and 7B, as previously introduced, the aquaculture assembly 10 may have one or more lower buoyancy members 32 and one or more upper buoyancy members 30. Each lower buoyancy member 32 may define a vent 46 (FIG. 7A). In various examples, the vent 46 may be in communication with a respective vent tube 48 (FIG. 7B). Each of the lower buoyancy members 32 may define a connection port 68 coupled with a respective connection tube 98. Each of the connection tubes 98 may be in fluid communication with the chamber 20 of the respective lower buoyancy member 32. The connection tubes 98 may further be operably coupled with a first central air tube 82 by a fitting 94 or other coupling member. In other words, the connection tubes 98 may be in fluid communication with the first central air tube 82.

The first central air tube 82 is coupled with and in fluid communication with a first valve 24A. A pump 22 may be operably coupled with the first valve 24A via a fill tube 90 to control the flow of air to and from the lower buoyancy members 32. A second valve 24B may be coupled with and in fluid communication with the first central air tube 82 and may be configured to selectively allow air to flow out of the first central air tube 82. In various examples, the first valve 24A and/or the second valve 24B may be a solenoid valve. However, it will be understood that other valve types and combinations of valve types may be used without departing from the scope of the present disclosure.

Figure 8:
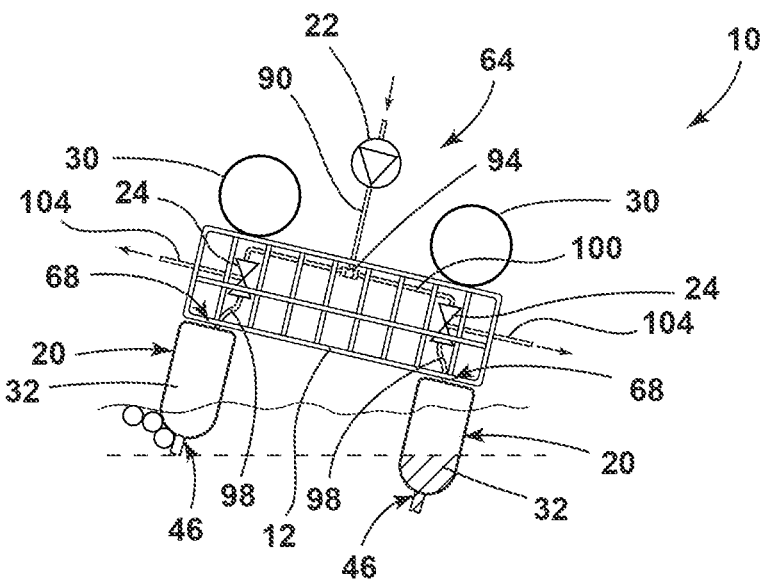
FIG. 8 is a schematic diagram of an aquaculture assembly having an exemplary air pumping system.

Alternatively, as shown in FIG. 8, each of the connection tubes 98 may be in fluid communication with the respective chamber 20 of the lower buoyancy members 32 and may further be in fluid communication with a respective valve 24. Each of the valves 24 is configured to control the flow of air to and from the respective lower buoyancy member 32. The valves 24 may be configured to operate in tandem or separately to allow one side of the assembly 10 to sink more than the other.

Each of the valves 24 may be further coupled with a plurality of central air tubes 100. The central air tubes 100 are in fluid communication with each of the valves 24 and with a fill tube 90 extending from the pump 22. In various examples, the central air tubes 100 may be coupled with the fill tube 90 via a fitting 94. The pump 22 is configured to provide or pull air through the fill tube 90 to or from the central air tubes 100. The release tube 104 may be configured to guide air through the valve 24 from the respective connection tube 98 and the chamber 20 of the respective lower buoyancy member 32 when the valve 24 is in the second open position.

Each of the valves 24 may further be coupled with a release tube 104 in addition to the central tubes 100 and the respective connection tubes 98. When the valves 24 are closed, no air flows to or from the chamber 20 of the respective lower buoyancy member 32. When the valves 24 are in a first open state, the air may be pumped by the pump 22 to or from the lower buoyancy members 32 via the connection tubes 98. Each of the valves 24 may further be configured to allow air to escape from the respective lower buoyancy member 32 when the valves 24 are in a second open state. Addition of air to the chamber 20 of either of the lower buoyancy members 32 causes water to be expelled from the chamber 20 of the respective lower buoyancy member 32 through the respective vent 46, resulting in increased buoyancy. Likewise, removal of air from the chamber 20 of either of the lower buoyancy members 32 further allows the chamber 20 of the respective lower buoyancy member 32 to fill with water through the vent 46, resulting in decreased buoyancy.

Use of the air pumping system 64 and the plurality of buoyancy members 18 allows the buoyancy of the aquaculture assembly 10 to be adjusted to facilitate vertical movement of the assembly 10. As previously discussed, addition of air to the buoyancy members 30, 32, 34, 36 increases the buoyancy of the aquaculture assembly 10 and raises the assembly 10 out of the water up to a raised position, while removal of air from the chambers 20 of the buoyancy members 30, 32, 34, 36 reduces the buoyancy of the assembly 10 and allows the assembly 10 to lower into the water to a floating position. In various examples, the assembly 10 may be configured to fill all of the buoyancy members 30, 32, 34, 36 of the assembly 10 with water to allow the assembly 10 to sink to the bottom of the body of water (e.g., the ocean floor). This allows desiccation of the aquaculture crop within the container 12 without having to physically flip the assembly 10.

Figure 9A:
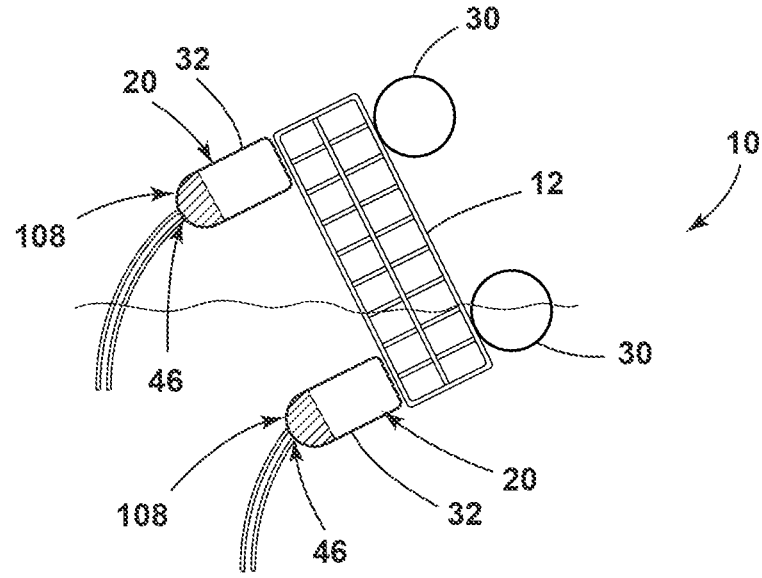
FIG. 9A is a schematic diagram of an aquaculture assembly having a keel system.

Referring now to FIG. 9A, a contemplated alternative aquaculture assembly 10 is shown having a keel assembly 108 positioned in each of the lower buoyancy members 32. Each keel assembly 108 may be held over the vent 46 by gravity when necessary to prevent air from escaping from the respective lower buoyancy members 32.

Figure 9B:
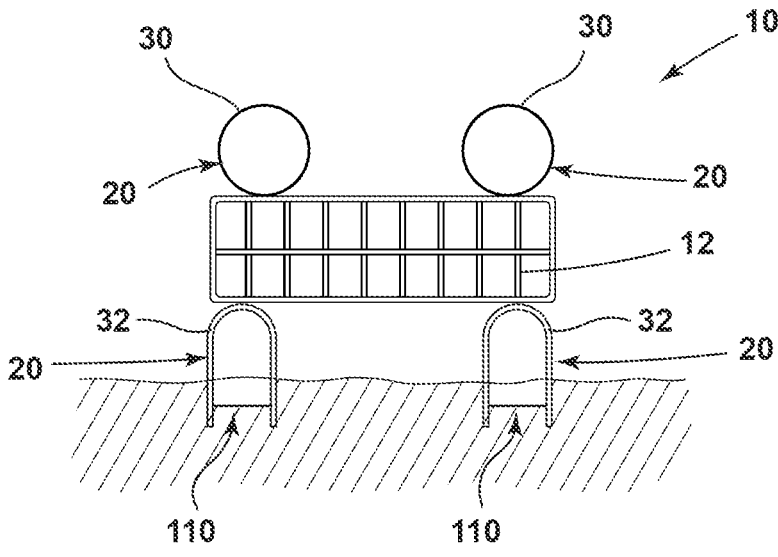
FIG. 9B is a schematic diagram of an aquaculture assembly having lower buoyancy members with open bottoms.
Figure 9C:
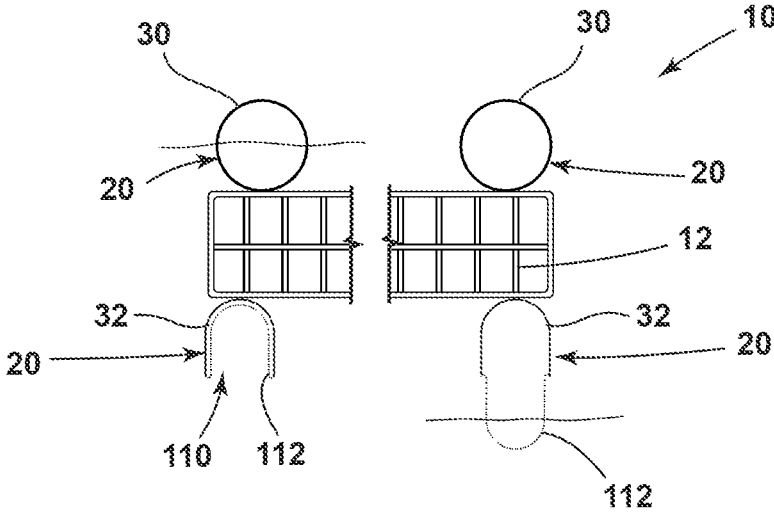
FIG. 9C is a schematic diagram of the aquaculture assembly of FIG. 9B including flexible members within the lower buoyancy members.

Referring now to FIGS. 9B and 9C, another contemplated alternative is having lower buoyancy members 32 with open bottoms 110. Open bottoms 110 of the lower buoyancy members 32 may allow passive venting of the air if waves exceed a predetermine maximum size and cause a tilting effect on the assembly 10. The passive venting may allow the assembly 10 to sink without direct input from a pumping system 164 to allow passive lowering of the assembly 10 when environmental conditions become unsafe for the assembly 10 to remain in a raised position.

As shown in FIG. 9C, each of the lower buoyancy members 32 may include a flexible insert 112 positioned proximate the respective open bottom 110. The insert 112 may selectively allow the chamber 20 of the respective lower buoyancy member 32 to fill with water or prevent water from entering the chamber 20. For example, where the insert 112 is expanded from addition of air into the chamber 20 to allow the lower buoyancy member 32 to float.

Figure 10A:
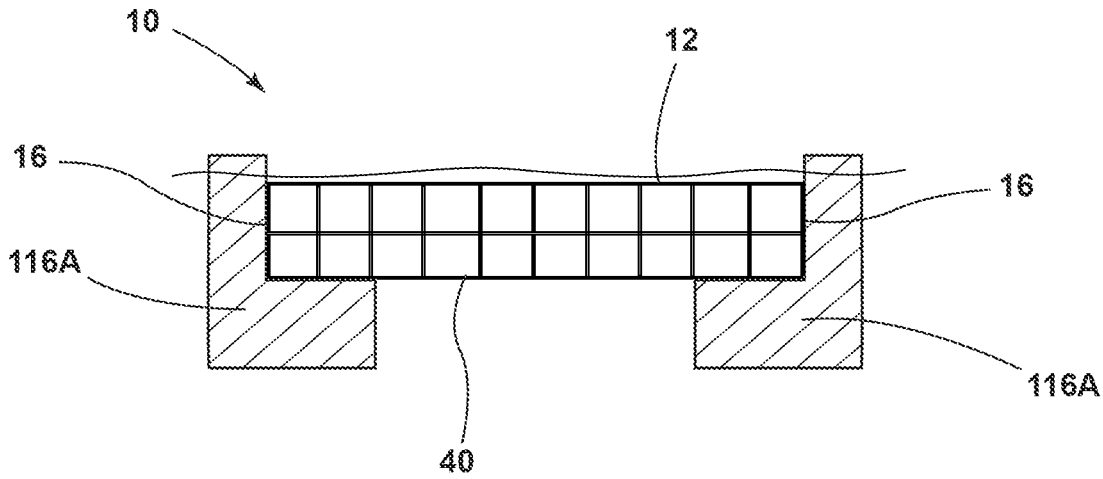
FIG. 10A is a schematic diagram of an aquaculture assembly having an L-shaped buoyancy member.
Figure 10B:
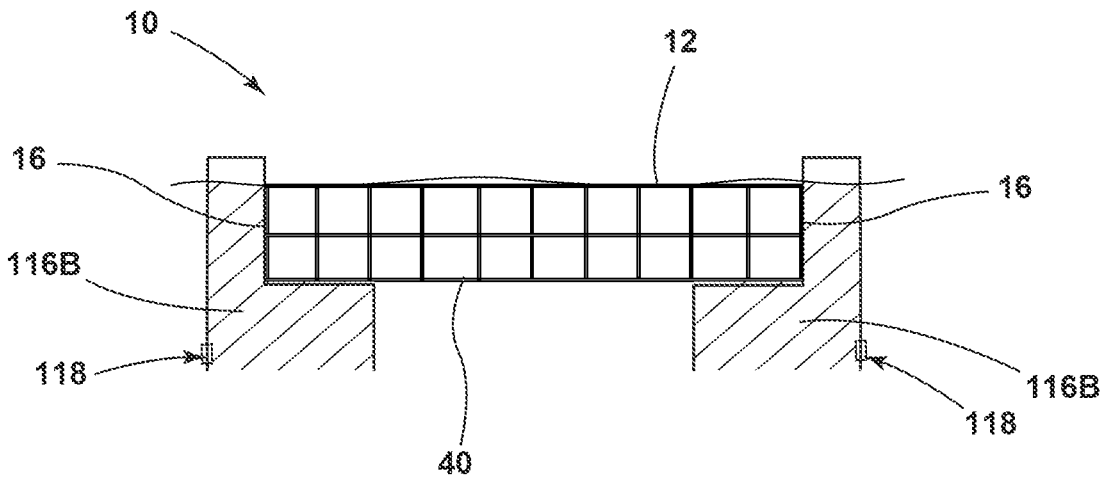
FIG. 10B is a schematic diagram of an aquaculture assembly having a pair of L-shaped buoyancy members with open bottoms.
Figure 10C:
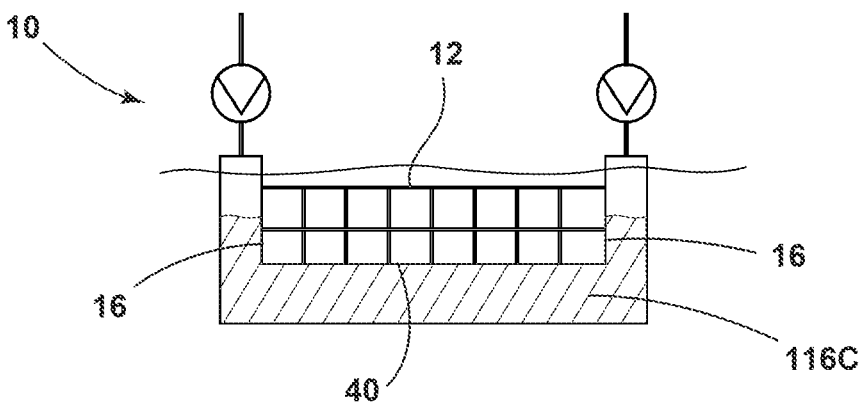
FIG. 10C is a schematic diagram of an aquaculture assembly having a C-shaped buoyancy member.

As shown in FIGS. 10A and 10B, one or both of the first and second side buoyancy members 34, 36 may be integrally formed with one or more lower buoyancy members 32 to create a single buoyancy member 116A, 116B, 116C. The combined single buoyancy member 116A may be an L-shaped buoyancy member extending across one or more edges of the container 12 (FIG. 10A). It is contemplated that a plurality of buoyancy members 18 having one or more of such a single buoyancy member 116B positioned may be combined with open bottoms 110, as shown in FIG. 10B. The buoyancy members 116B may further define air escape apertures 118 defined in the sides of the buoyancy members 116B. The air escape apertures 118 may be configured to allow air to escape on the higher side when the assembly 10 is tilted. Allowing the air to escape creates a leveling force on the assembly 10. In other examples, the single buoyancy member 116C may be a C-shaped buoyancy member extending along the bottom wall 40 of the container 12 and along at least part of one of the side walls 16 of the container 12 (FIG. 10BC). Such a single buoyancy member 116A, 116B, 116C may strengthen the overall aquaculture assembly 10 and may allow the aquaculture assembly 10 to withstand similar weather conditions to traditional floating cage systems.

Figure 11:
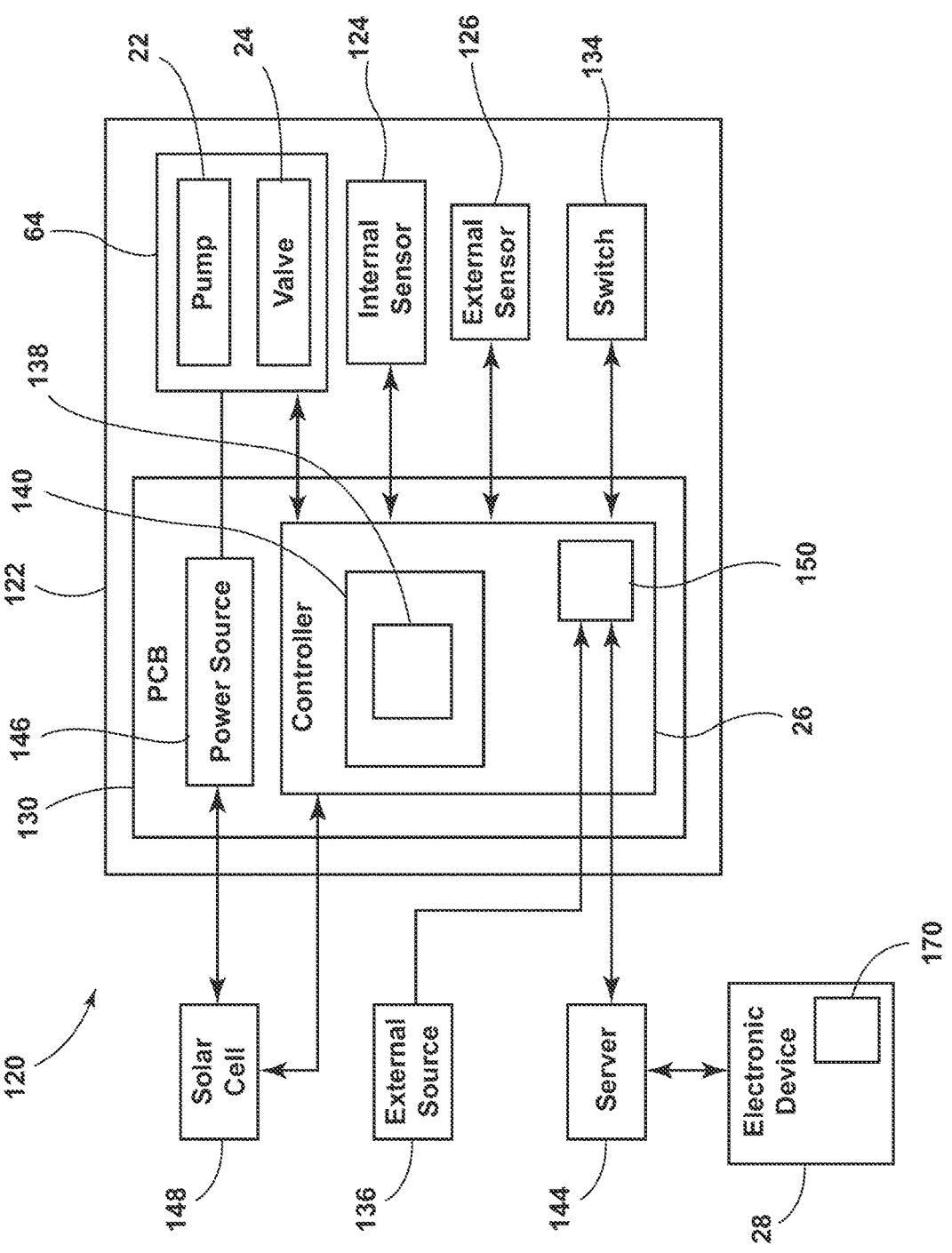
FIG. 11 is a schematic diagram of a control system for controlling an aquaculture assembly.

Referring now to FIGS. 1-11, the aquaculture assembly 10 further includes an electronic control system 120. As best shown in FIG. 11, the control system 120 may be positioned within a housing 122. The housing 122 may be separate from the container 12 and/or the buoyancy members 30, 32, 34, 36. In various examples, the housing 122 may further be removably coupled with one of the container 12 and/or the buoyancy members 30, 32, 34, 36 to allow removal of the housing 122 and the control system 120. Alternatively, the housing 122 may be integrally formed with one of the container 12 and/or one of the buoyancy members 30, 32, 34, 36. The housing 122 is configured to be weatherproof and/or sealed to protect the control system 120 from water infiltration. In various examples, an internal environmental sensor 124 and/or an external environmental sensor 126 may be positioned on or within the housing 122 and in communication with the controller 26. The internal environmental sensor 124 may be configured to provide information to a user regarding the environment the control system 120 is experiencing within the housing 122. For example, the internal environmental sensor 124 may be a temperature sensor, a humidity sensor, and/or any other sensor for determining the internal environment of the housing 122. The external environmental sensor 126 may be configured to provide information to a user regarding the external environmental of the housing 122 and/or the assembly 10. For example, the external environmental sensor 126 may be an accelerometer configured to sense speed, waves, or other motion changes of the assembly 10, a temperature sensor, a humidity sensor, or any other sensor configured to determine the external environment of the assembly 10. It will be understood that each of the internal environmental sensor 124 and the external environmental sensor 126 may formed one or more sensors without departing from the scope of the present disclosure.

As shown in FIG. 11, the control system 120 includes a printed circuit board (PCB) 130. A controller 26 may be positioned on the PCB 130 and may be operably coupled with the air pumping system 64 to provide electronically controlled opening and closing of the valves 24 and actuation of the pump(s) 22. It is contemplated that other arrangements not using a PCB 130 may be used without departing from the scope of the present disclosure.

The controller 26 may be configured to receive input from one or more sources, such as a switch 134 positioned on the housing 122 and/or an electronic device 28 configured to communicate with the control system 120 (e.g., a phone, a remote, or a computer), as described in more detail elsewhere herein. It is contemplated that other external input sources 136 may also be in communication with the controller 26 to provide information such as weather data, water quality data, and/or other environmental information relevant to the assembly 10, as discussed in more detail elsewhere herein.

The controller 26 may be configured to provide control outputs to the valves 24 and/or the pumps 22. The control outputs may determine the condition of the valves 24 and the state of actuation of the pumps 22. In various examples, routines 138 may be stored on a memory 140 of the controller 26. The routines 138 may be associated with predetermined or preprogrammed schedules for controlling airflow to and from the buoyancy members 30, 32, 34, 36 to facilitate moving the aquaculture assembly 10 from the floating position to the raised position and/or vertically rotating the aquaculture assembly 10. In other examples, the controller 26 may be configured to actuate one or more of the routines 138 in response to input from external sources 136. Input from the external sources 136 may be queried on a regular basis to receive the respective data (e.g., weather data may be queried from an external source 136 each hour). External sources 136 may provide data including storm data, historical weather data, and/or ocean weather data such as wave height and wave direction as well as water quality parameters such as water temperature and salinity.

In various examples, the controller 26 may be configured to begin one of the routines 138 based on the input regarding weather data from one of the external sources 136. For example, the controller 26 may initiate one of the routines 138 to remove air from the buoyancy members 30, 32, 34, 36 to allow the aquaculture assembly 10 to sink when a storm is detected, or the controller 26 may initiate one of the routines 138 to vertically rotate the aquaculture assembly 10 more or less frequently based on temperature data from one of the external sources 136. The controller 26 may be configured to receive weather prediction data from one or more of the external sources 136 and may be configured to actuate one of the routines 138 in response to the input from the respective external source 136. For example, the controller 26 may be configured to actuate a desiccation routine 138 to raise or lower the aquaculture assembly 10. The data from the external sources 136 may be in the form of ranges, events, or other measurable input, such as cloud cover, wind, precipitation probability, etc. The external sources 136 used for collecting the weather data may be determined based on GPS coordinates of the aquaculture assembly 10. Data and input used to determine which, if any, of the routines 138 to be actuated by the controller 26 may be stored on a server 144 for future access.

Referring still to FIG. 11, power may be provided to the control system 120 using a rechargeable power source 146, such as one or more rechargeable batteries. A solar cell 148 may be provided to allow the power source 146 to recharge. In various examples, one or more boost converters may be used to adjust the battery voltage and or solar cell voltage for the various electronic consumers. The solar battery charger may be configured to utilize maximum power point tracking (MPPT) to increase charging efficiency. In various examples, the controller 26 may be configured to selectively enter a deep sleep mode at predetermined times or on a predetermined schedule to reduce power requirements of the control system 120.

The control system 120 may be configured to be WiFi controlled or cellular controlled and may include components 150 necessary for any or a combination of wireless systems. For example, the controller 26 may include a cellular modem for future remote control at remote locations. In various examples, the controller 26 may be configured to store and/or communicate telemetry of the aquaculture assembly 10 (e.g., battery state, temperature of the electronics, etc.) by communicating the telemetry information from the control system 120 to the server 144 using the wireless system provided. The telemetry information may be stored on the server 144. This may allow farmers to keep a record of cycles and may be configured to provide reports on the cycles for use in verifying mollusk quality.

Figure 12:
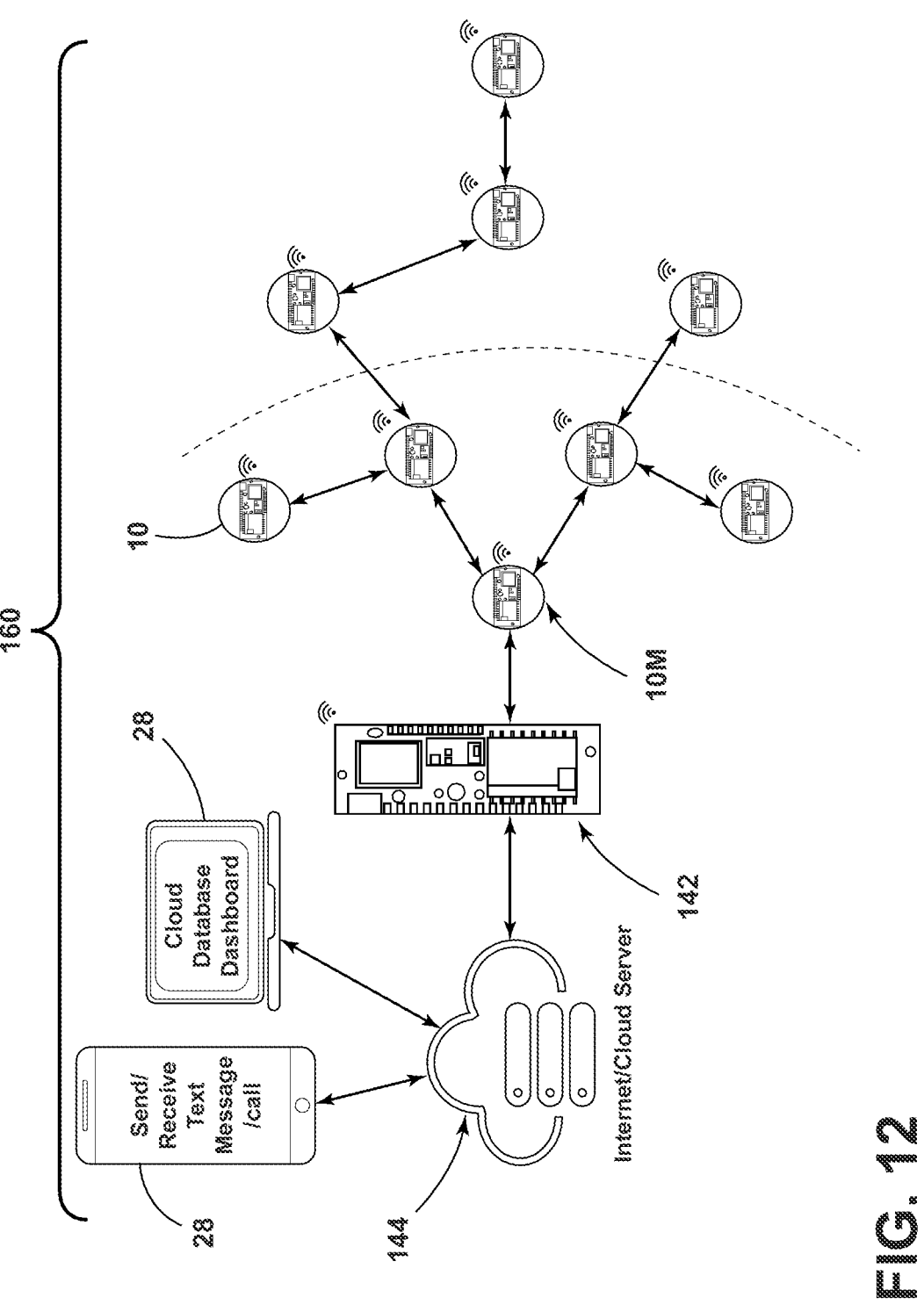
FIG. 12 is a schematic diagram of a communication network for communicating with one or more aquaculture assemblies.

Referring now to FIG. 12, multiple aquaculture assemblies 10 can be connected as a mesh network. For example, using low cost IoT (Internet of Things) electronics, a mesh network 160 between individual aquaculture assemblies 10 can be established. Long range shore to farm communication can be established via a master/relay aquaculture assembly 10M and a land-based module 142 in communication with the master/relay aquaculture assembly 10 via cellular (e.g., LTE, 4G, 5G, or current generation) or some other longer-range radio frequency (RF) communication protocol (e.g., LoRa, Sigfox, NB-IoT). Data related to each of the individual aquaculture assemblies 10 (e.g., location, position, time of farming) can be stored on a land-based server 144. It is contemplated that the individual aquaculture assemblies 10 may be grouped in any number of groups with each group having any size via the mesh network 160. It is further contemplated that the allocation of the aquaculture assemblies 10 to the various groups, including the designation of the master aquaculture assembly 10M, can be changed by a user throughout the life of the aquaculture assembly 10. Scheduled position changes, i.e., sinking/raising of one or more of the aquaculture assemblies 10, may be assigned to individual groups within the mesh network 160 and/or to individual assemblies 10. The scheduled position changes and all manual interventions can be updated/communicated from the server 144 to the individual assemblies 10 at regular time intervals, (e.g., every hour, daily, weekly, etc.). This allows the controllers 26 and/or the control systems 120 of the assemblies 10 to remain in low power mode when not in communication with the server 144. It will be understood that the server 144 may be any server including Cloud hosted servers without departing from the scope of the present disclosure.

Referring now to FIGS. 11-16, the control system 120 may be operable via an electronic device 28. For example, the control system 120 may be operable via a remote having a user input for controlling power to the pumps 22 and/or the valves 24. In other examples, the control system 120 may be operable via a personal electronic device 28 using an application 170 configured to be stored on the device 28. The application 170 may be configured to collect and store data from one or more aquaculture assemblies 10. The application 170 may further be configured to communicate preprogrammed and/or newly programmed routines 138 onto the controller 26 to allow for automated initiation of one or more routines 138 in response to input from external sources 136 and/or user input from the application 170. The application 170 may further be configured to designate the groups of the assemblies 10 and collect data from and/or communicate routines 138 to and from each of the groups of assemblies 10. It is contemplated that the application 170 may be configured to be stored on any personal electronic device 28 including, for example, a mobile phone, a tablet, or a computer.

Figure 13:
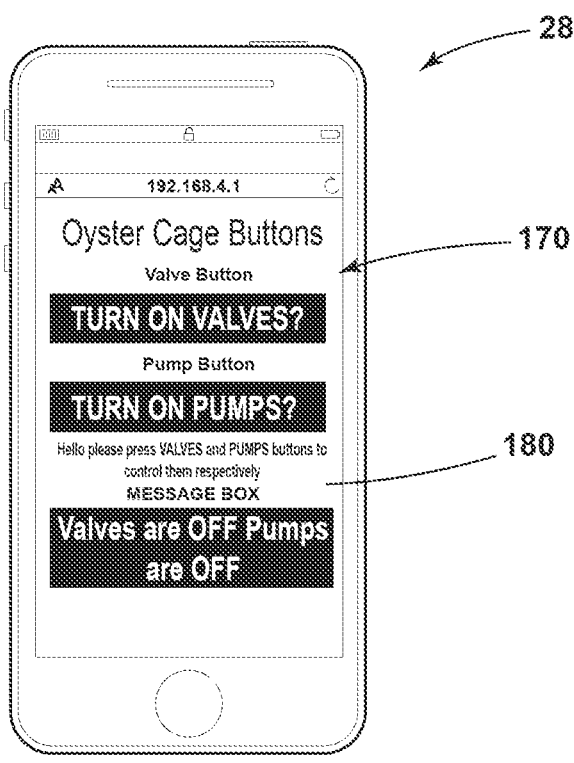
FIG. 13 is a schematic diagram of an electronic device illustrating an exemplary application screen.

As shown in FIGS. 13-16, various screens of the application 170 as shown on an exemplary electronic device 28 are illustrated. For example, as shown in FIG. 13, the application 170 may include a home screen 180 displayed on the electronic device 28. The home screen 180 may include a button 182 for turning on and off the pumps 22 and a button 184 for turning on and off one or more of the valves 24. The home screen 180 may further include a display 186 indicating the state of the pumps 22 and the valves 24 (e.g., on or off) for user reference.

Figure 14:
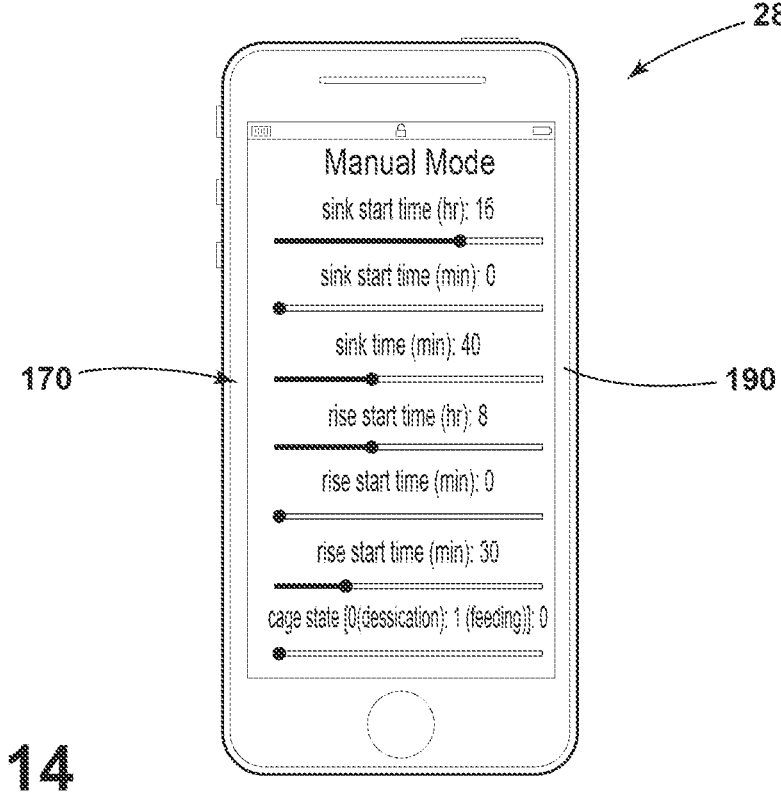
FIG. 14 is a schematic diagram of an electronic device illustrating an exemplary application screen.

As shown in FIG. 14 the application 170 may include a manual mode screen 190. The manual mode screen 190 may include sliders 192 to manually communicate a routine 138 to and/or store a routine 138 on the controller 26 from the electronic device 28 via communication with the server 144. The sliders 192 may be configured to allow a user to set desired time-frames for desiccating and feeding times for one or more assemblies 10.

Figure 15:
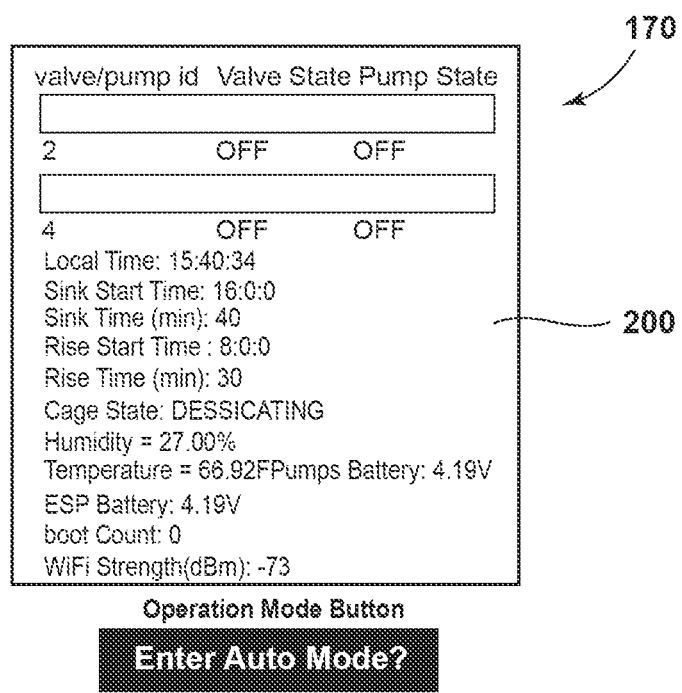
FIG. 15 illustrates an exemplary application screen.
Figure 16:
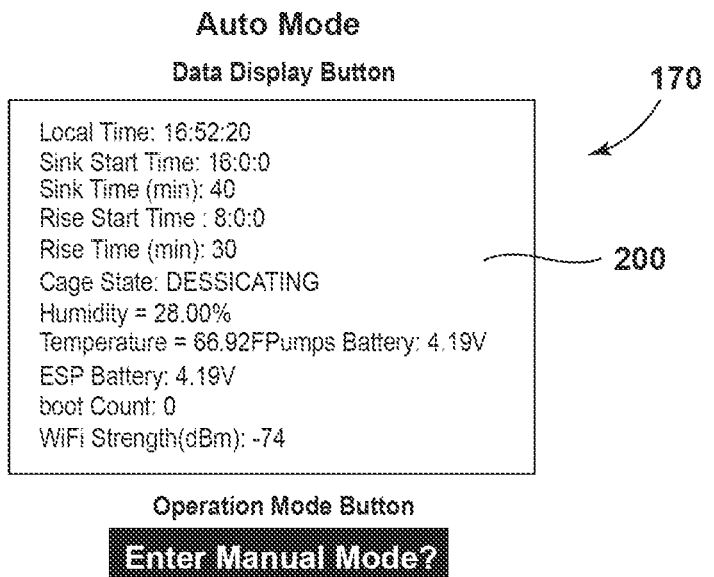
FIG. 16 illustrates an exemplary application screen.

Referring now to FIG. 15, the application 170 may further include a home screen 200 having a toggle 202 between an auto mode (where the routine 138 is selected and/or programmed based on input and data from one or more external sources 136) and a manual mode (where the routine 138 is provided by the user from the electronic device 28). The application home screen 190 may be configured to allow a user to set assembly control variables or other parameters and/or may be configured to display sensor data from the sensors 124, 126, display the status or position of the respective aquaculture assembly 10, or display other parameters of the control system 120 such as battery health, temperature, etc.

Use of the aquaculture assembly disclosed herein in connection with the network 160 and remote-control options may improve farmers abilities to raise and lower containers to adjust the position of the aquaculture crop within containers to allow desiccation without flipping the assembly. It may also allow the container to be automatically adjusted without any user input. Where the application is used, the application may improve access to the necessary controls from any location.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions and arrangement of the exemplary embodiments without departing from the spirit of the present disclosure.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An adjustable aquaculture assembly comprising:
a container defining a retention space and configured to allow flow through the container into the retention space;
a plurality of buoyancy members coupled with the container, each buoyancy member configured to be selectively filled with and emptied of air;
an air pump operably coupled with at least one of the plurality of buoyancy members and configured to pump air for controlling airflow to and from the at least one of the plurality of buoyancy members;
a valve operably coupled with at least one of the plurality of buoyancy members; and
a controller configured to actuate the air pump.

2. The adjustable aquaculture assembly of claim 1, wherein the plurality of buoyancy members includes an upper buoyancy member defining a chamber filled with air and positioned on a top wall of the container.

3. The adjustable aquaculture assembly of claim 1, wherein the plurality of buoyancy members includes a lower buoyancy member defining a chamber in fluid communication with the air pump and the valve, the lower buoyancy member configured to be at least partially filled with air.

4. The adjustable aquaculture assembly of claim 1, wherein the valve is a solenoid valve in communication with the controller, the controller configured to control the state of the valve.

5. The adjustable aquaculture assembly of claim 1, further comprising:
a wireless component in communication with the controller;
an electronic device in wireless communication with the wireless component and configured to provide input to the controller.

6. The adjustable aquaculture assembly of claim 5, wherein the electronic device includes an application stored on the electronic device and configured to transmit input from the electronic device to the controller.

7. The adjustable aquaculture assembly of claim 1, wherein the plurality of buoyancy member includes first and second side buoyancy members positioned on opposing sides of the container.

8. The adjustable aquaculture assembly of claim 1, wherein the lower buoyancy member includes at least one vent configured to allow water to flow into a volume of the chamber not filled with air.

9. The adjustable aquaculture assembly of claim 1, wherein each of the plurality of buoyancy members defines a vent configured to allow water to flow into and out of the buoyancy member as air is pumped out of and into the buoyancy member, respectively.

10. An adjustable aquaculture assembly comprising:
a container defining a retention space and configured to allow flow through the retention space;
an upper buoyancy member positioned on a top wall of the container;
a lower buoyancy member positioned on a bottom wall of the container;
a first side buoyancy member positioned on a first side wall of the container;

a second side buoyancy member positioned on a second side wall of the container, the second side wall opposite the first side wall;
an air pumping system coupled with at least one of the first and second side buoyancy members and including an air pump and a valve, wherein the air pumping system is configured to selectively control airflow to and from the at least one of the first and second side buoyancy members to selectively adjust buoyancy of the container; and
a controller configured to selectively actuate at least one of the air pump and the valve in response to inputs.

11. The adjustable aquaculture assembly of claim 10, wherein the lower buoyancy member and at least one of the first and second side buoyancy members are integrally formed as a single buoyancy member.

12. The adjustable aquaculture assembly of claim 10, wherein the controller is configured to receive inputs from external sources related to at least one of weather conditions and ocean water quality conditions.

13. The adjustable aquaculture assembly of claim 10, further comprising:
an electronic device in wireless communication with the wireless component and including an application configured to collect user input and transmit the user input to the controller.

14. The adjustable aquaculture assembly of claim 10, wherein the upper buoyancy member and the lower buoyancy member are configured to be interchangeable such that the container may be vertically rotated.

15. An adjustable aquaculture assembly comprising:
a container at least partially open and defining a retention space;
at least one upper buoyancy member positioned on the container and configured to be selectively filled with and emptied of air;
at least one lower buoyancy member positioned on the container and configured to be selectively filled with and emptied of air; and
an air pumping system coupled with at least one of the upper and lower buoyancy members and including at least one of an air pump and a valve, wherein the air pumping system is configured to selectively control airflow to and from the at least one of the upper and lower buoyancy members to selectively adjust buoyancy of the container.

16. The adjustable aquaculture assembly of claim 15, further comprising:
a first side buoyancy member defining a first side chamber;
a second side buoyancy member positioned opposite the first side buoyancy member and defining a second side chamber, wherein the air pumping systems is configured to selectively control airflow to and from at least one of the first and second side chambers.

17. The adjustable aquaculture assembly of claim 15, further comprising:
a controller configured to selectively actuate the air pumping system in response to inputs.

18. The adjustable aquaculture assembly of claim 17, further comprising:
a power source configured to provide power to the controller, wherein the power source includes a battery and a solar cell, the solar cell configured to recharge the battery.

19. The adjustable aquaculture assembly of claim 17, further comprising:

a wireless component in communication with the controller;

an electronic device in wireless communication with the wireless component and configured to provide input to the controller.

20. The adjustable aquaculture assembly of claim 19, wherein the electronic device includes an application stored on the electronic device and configured to transmit input from the electronic device to the controller.

21. The adjustable aquaculture assembly of claim 1, wherein the plurality of buoyancy members includes at least one upper buoyancy member filled with air and positioned on a top wall of the container, wherein the plurality of buoyancy members includes at least one lower buoyancy member positioned on a bottom wall of the container and defining a chamber in fluid communication with the air pump and valve, and wherein the at least one upper buoyancy member is configured to generate a buoyancy force sufficient for holding the container near a surface of water in which the container is submerged when the at least one lower buoyancy member is completely filled with water such that at least a portion of the adjustable aquaculture assembly is above the surface of the water.

22. The adjustable aquaculture assembly of claim 1, wherein the plurality of buoyancy members includes at least one upper buoyancy member positioned on a top wall of the container, wherein the plurality of buoyancy members includes at least one lower buoyancy member positioned on a bottom wall of the container and defining a chamber in fluid communication with the air pump and valve, and wherein the plurality of buoyancy members includes a first side buoyancy member and a second side buoyancy member positioned on opposing sides of the container for stabilizing the adjustable aquaculture assembly during transitions between a first position for which the container is at or above a surface of water and a second position for which the container is below the surface of the water.

23. The adjustable aquaculture assembly of claim 22, wherein the first side buoyancy member defines a chamber in fluid communication with the chamber of the at least one lower buoyancy member.

24. The adjustable aquaculture assembly of claim 23, wherein the chamber of the first side buoyancy member is in fluid communication with the chamber of the at least one lower buoyancy member through at least one tube connected between the first side buoyancy member and the at least one lower buoyancy member.

25. The adjustable aquaculture assembly of claim 24, wherein the air pump is configured to pump air through the chamber of the first side buoyancy member and the at least one tube to the chamber of the at least one lower buoyancy member.

26. The adjustable aquaculture assembly of claim 23, wherein the second side buoyancy member defines a chamber in fluid communication with the chamber of the at least one lower buoyancy member.

27. The adjustable aquaculture assembly of claim 26, wherein the chamber of the second side buoyancy member is in fluid communication with the chamber of the at least one lower buoyancy member through at least one tube connected between the second side buoyancy member and the at least one lower buoyancy member.

28. The adjustable aquaculture assembly of claim 1, wherein the plurality of buoyancy members includes at least one upper buoyancy member positioned on a top wall of the container, wherein the plurality of buoyancy members includes at least one lower buoyancy member positioned on a bottom wall of the container and defining a chamber in fluid communication with the air pump and valve, wherein the controller is configured to control the air pump and the valve such that the adjustable aquaculture assembly is selectively transitioned between a floating position and a raised position, wherein the container is at or above a surface of water when the adjustable aquaculture assembly is in the raised position, wherein the container is submerged below the surface of the water when the adjustable aquaculture assembly is in the floating position, wherein the at least one upper buoyancy member is configured to generate a buoyancy force sufficient for holding the container near the surface of the water such that at least a portion of the adjustable aquaculture assembly is above the surface of the water when the adjustable aquaculture assembly is in the floating position, and wherein the air pump is mounted above the top wall such that the air pump is above the surface of the water when the adjustable aquaculture assembly is in the floating position.

* * * * *